(12) United States Patent
Bryan et al.

(10) Patent No.: US 7,660,509 B2
(45) Date of Patent: Feb. 9, 2010

(54) BACKLIGHT ASYMMETRIC LIGHT INPUT WEDGE

(75) Inventors: William J. Bryan, Mahtomedi, MN (US); John C. Schultz, Afton, MN (US); Michael A. Meis, Stillwater, MN (US); Patrick R. Destain, Loveland, OH (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/439,764

(22) Filed: May 24, 2006

(65) Prior Publication Data

US 2007/0279931 A1 Dec. 6, 2007

(51) Int. Cl.
  G02B 6/10 (2006.01)
  G02F 1/1335 (2006.01)
  F21V 7/04 (2006.01)

(52) U.S. Cl. .................... 385/146; 349/65; 362/610; 362/621

(58) Field of Classification Search .............. 349/65, 349/67; 385/129, 146; 362/608, 609, 610, 362/615, 621, 622, 628
See application file for complete search history.

(56) References Cited

U.S. PATENT DOCUMENTS

| | | | |
|---|---|---|---|
| 3,923,381 A | 12/1975 | Winston | |
| 4,013,915 A | 3/1977 | Dufft | |
| 4,240,692 A | 12/1980 | Winston | |
| 4,918,583 A | 4/1990 | Kudo et al. | |
| 4,963,933 A | 10/1990 | Brownlee | |
| 5,001,609 A | 3/1991 | Gardner et al. | |
| 5,050,946 A | 9/1991 | Hathaway et al. | |
| 5,055,978 A | 10/1991 | Rogoff | |
| 5,059,013 A | 10/1991 | Jain | |
| 5,202,950 A | 4/1993 | Arego et al. | |
| 5,255,171 A | 10/1993 | Clark | |
| 5,296,601 A | 3/1994 | Suto et al. | |
| 5,359,691 A * | 10/1994 | Tai et al. | 385/146 |
| 5,671,028 A * | 9/1997 | Okano | 349/66 |
| 5,835,661 A | 11/1998 | Tai et al. | |
| 5,854,872 A | 12/1998 | Tai | |
| 5,876,107 A | 3/1999 | Parker et al. | |
| 5,882,774 A * | 3/1999 | Jonza et al. | 428/212 |
| 5,926,601 A | 7/1999 | Tai et al. | |
| 6,080,467 A | 6/2000 | Weber et al. | |

(Continued)

FOREIGN PATENT DOCUMENTS

EP 760962 10/2002

(Continued)

*Primary Examiner*—Uyen Chau N Le
*Assistant Examiner*—John M Bedtelyon
(74) *Attorney, Agent, or Firm*—Lance L. Vietzke

(57) ABSTRACT

A backlight is disclosed and includes a visible light transmissive body primarily propagating light by TIR with a light input surface and a light output surface and a light guide portion and a light input portion. The light guide portion has a light reflection surface and a light emission surface. The light input portion has opposing side surfaces that are not parallel. One of the opposing surfaces is co-planar with either the light emission surface or the light reflection surface. A light source is disposed adjacent to the light input surface. The light source emits light into the light input portion. A reflective layer is disposed adjacent to or on the opposing side surfaces.

14 Claims, 3 Drawing Sheets

U.S. PATENT DOCUMENTS

| | | | |
|---|---|---|---|
| 6,104,454 A | 8/2000 | Hiyama et al. | |
| 6,905,220 B2 | 6/2005 | Wortman et al. | |
| 6,924,014 B2 | 8/2005 | Ouderkirk et al. | |
| 6,950,220 B2 | 9/2005 | Abramson et al. | |
| 6,975,370 B2 | 12/2005 | Yu et al. | |
| 7,080,932 B2 | 7/2006 | Keuper | |
| 7,178,964 B2 * | 2/2007 | Sugiura et al. | 362/616 |
| 7,262,708 B1 | 8/2007 | Addicks | |
| 7,317,182 B2 | 1/2008 | Schultz et al. | |
| 7,497,609 B2 * | 3/2009 | Maeda et al. | 362/616 |
| 2001/0046131 A1 | 11/2001 | Hoelen et al. | |
| 2002/0030772 A1 | 3/2002 | Nauta et al. | |
| 2002/0061178 A1 | 5/2002 | Winston et al. | |
| 2002/0141174 A1 | 10/2002 | Parker | |
| 2002/0191416 A1 | 12/2002 | Wesson | |
| 2003/0076034 A1 | 4/2003 | Marshall et al. | |
| 2003/0165067 A1 | 9/2003 | Imamura et al. | |
| 2003/0189828 A1 | 10/2003 | Coushaine | |
| 2004/0042233 A1 | 3/2004 | Suzuki et al. | |
| 2004/0062028 A1 | 4/2004 | Winston et al. | |
| 2004/0071437 A1 | 4/2004 | Tamura et al. | |
| 2004/0114068 A1 | 6/2004 | Yu et al. | |
| 2004/0161222 A1 | 8/2004 | Niida et al. | |
| 2004/0175552 A1 | 9/2004 | Ouderkirk | |
| 2004/0201990 A1 | 10/2004 | Meyer | |
| 2004/0207775 A1 | 10/2004 | Min et al. | |
| 2005/0007753 A1 | 1/2005 | Van Hees et al. | |
| 2005/0023545 A1 | 2/2005 | Camras et al. | |
| 2005/0146894 A1 | 7/2005 | Keuper | |
| 2005/0207178 A1 | 9/2005 | Parker | |
| 2005/0259939 A1 | 11/2005 | Rinko | |
| 2006/0002141 A1 | 1/2006 | Ouderkirk et al. | |
| 2006/0002678 A1 | 1/2006 | Weber et al. | |
| 2006/0008205 A1 | 1/2006 | Meir et al. | |
| 2006/0104092 A1 | 5/2006 | Feng et al. | |
| 2006/0109684 A1 | 5/2006 | Nesterenko et al. | |
| 2006/0132423 A1 | 6/2006 | Travis | |
| 2006/0197433 A1 | 9/2006 | Chen | |
| 2006/0209564 A1 | 9/2006 | Lin et al. | |
| 2007/0014126 A1 | 1/2007 | Kuo et al. | |
| 2007/0025680 A1 | 2/2007 | Winston et al. | |
| 2007/0081360 A1 * | 4/2007 | Bailey et al. | 362/621 |
| 2007/0274094 A1 | 11/2007 | Schultz et al. | |
| 2007/0274095 A1 | 11/2007 | Destain | |
| 2007/0279931 A1 | 12/2007 | Bryan et al. | |

FOREIGN PATENT DOCUMENTS

| | | |
|---|---|---|
| JP | 200315413 | 1/2003 |
| JP | 2003-272424 | 9/2003 |
| JP | 2004-022175 | 1/2004 |
| JP | 2004031064 | 1/2004 |
| JP | 2004-158452 | 6/2004 |
| JP | 2004247207 | 9/2004 |
| JP | 2005-135844 | 5/2005 |
| JP | 2006128896 | 5/2006 |
| WO | WO 01084229 | 11/2001 |
| WO | WO 03048635 | 6/2003 |
| WO | WO 03096925 | 11/2003 |

* cited by examiner

BACKLIGHT ASYMMETRIC LIGHT INPUT WEDGE

BACKGROUND

The present disclosure relates generally to backlights having asymmetric light input wedges.

Optical devices employing backlights are used, for example, in displays for laptop computers, hand-held calculators, digital watches, cellphones, televisions and similar devices as well as illuminated signs and many other devices.

SUMMARY

In one exemplary implementation, the present disclosure is directed to a backlight that includes a visible light transmissive body primarily propagating light by TIR with a light input surface and a light output surface and a light guide portion and a light input portion. The light guide portion has a light reflection surface and a light emission surface. The light input portion has opposing side surfaces that are not parallel. One of the opposing surfaces is co-planar with either the light emission surface or the light reflection surface. A light source is disposed adjacent to the light input surface. The light source emits light into the light input portion. A reflective layer is disposed adjacent to or on the opposing side surfaces.

In another exemplary implementation, the present disclosure is directed to a backlight that includes an asymmetric diverging wedge defined by a narrow end surface and a wide end surface, and opposing side surfaces that are not parallel and extend between the narrow end and the wide end. A light source is disposed adjacent to the narrow end surface. The light source emits light into the narrow end surface of the diverging wedge. A light guide is optically coupled to the wide end surface. The light guide has a light reflection surface and a light emission surface and an opposing side surface is co-planar with either the light emission surface or the light reflection surface. A reflective layer is disposed adjacent to or on the opposing side surfaces.

In a further exemplary implementation, the present disclosure is directed to a backlight that includes a first asymmetric diverging wedge defined by a first narrow end surface and a first wide end surface and first opposing side surfaces that are not parallel and extend between the first narrow end and the first wide end. A first is disposed adjacent to the first narrow end surface. The first light source emits light into the first narrow end surface of the first asymmetric diverging wedge. A second asymmetric diverging wedge is defined by a second narrow end surface and a second wide end surface and second opposing side surfaces that are not parallel and extend between the second narrow end and the second wide end. A second light source is disposed adjacent to the second narrow end surface. The second light source emits light into the second narrow end surface of the second asymmetric diverging wedge. A light guide is optically coupled to the first wide end surface and the second wide end surface. The light guide has a light reflection surface and a light emission surface and an opposing side surface is co-planar with either the light emission surface or the light reflection surface. A reflective layer is disposed adjacent to or on the first and second opposing side surfaces.

These and other aspects of the subject invention will become readily apparent to those of ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, in which.

DETAILED DESCRIPTION

Figure 1:
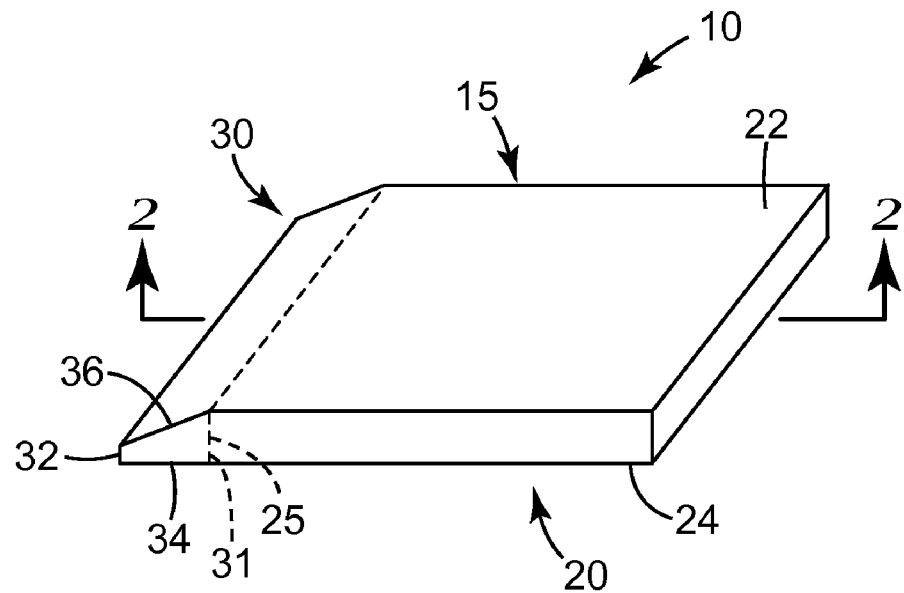
FIG. 1 provides an illustrative perspective schematic view of a backlight.

The present disclosure is directed to backlights having asymmetric light input wedges, and particularly to backlights having asymmetric light input wedges with specular reflective polymeric mirror film. While the present invention is not so limited, an appreciation of various aspects of the invention will be gained through a discussion of the examples provided below.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

A specularly reflective surface is a surface for which an incident light ray is reflected such that the reflected angle is equal to the angle of incidence. On a practical basis, all surfaces have some deformation which results in some scattering of the reflected light ray and for the purposes of this disclosure, a value of 10% of the light energy may be reflected at angles not equal to the incident angle. In many embodiments, there is less than 1% of the light reflected at angles not equal to the incident angle.

The present disclosure is applicable to illumination assemblies, and is more particularly applicable to backlight assemblies that provide illumination using light sources. The backlight assemblies disclosed herein can be used for general lighting purposes, e.g., to illuminate an area, or for providing information to a viewer by selective illumination of different areas of the assembly as in an information display. Such assemblies are suitable for use in backlight displays, signs, luminaries, and other lighting applications that require a significant amount of light.

The light sources described herein can include any suitable light source. In some embodiments, the light source is a cold cathode fluorescent lamp (CCFL). In many embodiments, the light source includes one or more solid state light sources such as, discrete light emitting diodes (LED) dies or chips with associated electrical substrate and optionally a thermal dissipating mechanism. As used herein, the terms "LED" and "light emitting diode" refer generally to light emitting semiconductor elements with contact areas for providing power to the diode. A III-V semiconductor light emitting diode may be formed, for example, from a combination of one or more Group III elements and one or more Group V elements. Suitable materials include nitrides, such as gallium nitride or indium gallium nitride, and phosphides, such as indium gallium phosphide. Other types of III-V materials can also be used, as can inorganic materials from other groups of the periodic table. In many LED embodiments, the LED is a "flip-chip" or "wire bond" LED.

LEDs can be selected to emit at any desired wavelength, such as in the red, green, blue, cyan, magenta, yellow, ultraviolet, or infrared spectral regions. In an array of LEDs, the LEDs can each emit in the same spectral region, or can emit in different spectral regions. Different LEDs may be used to produce different colors where the color of light emitted from the light emitting element is selectable. Individual control of the different LEDs leads to the ability to control the color of the emitted light. In addition, if white light is desired, then a number of LEDs emitting light of different colors may be provided, whose combined effect is to emit light perceived by a viewer to be white.

Another approach to producing white light is to use one or more LEDs that emit light at a relatively short wavelength and to convert the emitted light to white light using a phosphor wavelength converter. White light is light that stimulates the photoreceptors in the human eye to yield an appearance that an ordinary observer would consider "white." Such white light may be biased to the red (commonly referred to as warm white light) or to the blue (commonly referred to as cool white light). Such light can have a color rendering index of up to 100. In one embodiment, a collection of red, blue, and green LED dies can be selectively placed in an array. The resulting emission of light is seen by an observer as colored light or "white" light, when blended together in concert.

In other embodiments, the radiation or light sources includes organic light emitting diodes (OLED), vertical cavity surface emitting lasers (VCSEL), laser diodes, and the like.

The light input wedges described herein include a specular reflective layer that is disposed adjacent to but not in intimate contact with at least, the diverging surfaces of the light input wedge. Since the specular reflective layer is not in intimate contact with the light input wedge diverging sides, light moves out of the diverging wedge mostly via direct emission or through total internal reflection (TIR). Light that escapes through the diverging sides of the light input wedge is then reflected via the specular reflective layer. This configuration has been found to improve the efficiency of the light input wedge. The specular reflective layer can be any useful specular reflective layer such as, for example, a metal or dielectric material. Illustrative specular reflective metal layers or films include silvered mirrors, polished metallic or metallized surfaces.

In many embodiments, the backlight devices described herein utilize the unique and advantageous properties of multilayer optical films as the specular reflective layer. The advantages, characteristics and manufacturing of such films are most completely described in U.S. Pat. No. 5,882,774, which is incorporated herein by reference. The multilayer optical film is useful, for example, as highly efficient spectral mirrors. A relatively brief description of the properties and characteristics of the multilayer optical film is presented below followed by a description of illustrative embodiments of backlight systems using the multilayer optical mirror film according to the present disclosure.

Multilayer optical mirror films as used in conjunction with the present invention exhibit relatively low absorption of incident light, as well as high reflectivity for off-axis as well as normal light rays. The unique properties and advantages of the multi-layer optical film provides an opportunity to design highly efficient backlight systems which exhibit low absorption losses when compared to known backlight systems. Exemplary multilayer optical mirror film of the present invention is described in U.S. Pat. No. 6,924,014, which is incorporated herein by reference (see Example 1 and Example 2). Exemplary multilayer optical mirror film includes a multilayer stack having alternating layers of at least two materials. At least one of the materials has the property of stress induced birefringence, such that the index of refraction (n) of the material is affected by the stretching process. The difference in refractive index at each boundary between layers will cause part of ray to be reflected. By stretching the multilayer stack over a range of uniaxial to biaxial orientation, a film is created with a range of reflectivities for differently oriented plane-polarized incident light. The multilayer stack can thus be made useful as a mirror. Multilayer optical films constructed accordingly exhibit a Brewster angle (the angle at which reflectance goes to zero for light incident at any of the layer interfaces) which is very large or is nonexistent. As a result, these polymeric multilayer stacks having high reflectivity for both s and p polarized light over a wide bandwidth, and over a wide range of angles, reflection can be achieved.

The multilayer polymeric mirror film can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials. The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers. In many embodiments, the multilayer polymeric mirror film includes low/high index pairs of film layers, wherein each low/high index pair of layers has a combined optical thickness of ½ the center wavelength of the band it is designed to reflect.

For multilayer polymeric mirror films, the desired average transmission for light of each polarization and plane of incidence generally depends upon the intended use of the reflective mirror film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400-700 nm) is desirably less than 10% (reflectance greater than 90%), or less than 5% (reflectance greater than 95%), or less than 2% (reflectance greater than 98%), or less than 1% (reflectance greater than 99%). The average transmission at 60 degrees from the normal from 400-700 nm is desirably less than 20% (reflectance greater than 80%), or less than 10% (reflectance greater than 90%), or less than 5% (reflectance greater than 95%), or less than 2% (reflectance greater than 98%), or less than 1% (reflectance greater than 99%).

With the design considerations described in the above mentioned U.S. Pat. No. 5,882,774, one of ordinary skill will readily appreciate that a wide variety of materials can be used to form multilayer polymeric reflective mirror films when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material. Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyetheramides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof, (c) phthalic acid, or esters thereof, (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

In many embodiments, the multilayer polymeric reflective mirror film alternating layers include PET/Ecdel, PEN/Ecdel, PEN/sPS, PEN/THV, PEN/co-PET, and PET/sPS, where "co-PET" refers to a copolymer or blend based upon terephthalic acid, Ecdel is a thermoplastic polyester commercially available from Eastman Chemical Co., and THV is a fluoropolymer commercially available from 3M Company, St. Paul, Minn.

The number of layers in the film is selected to achieve the desired optical properties using the minimum number of layers for reasons of film thickness, flexibility and economy. The number of layers can be less than 10,000, or less than 5,000, or less than 2,000. The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (or from 1:3 to 1:7) in the stretch direction and from 1:0.2 to 1:10 (or from 1:0.3 to 1:7) orthogonal to the stretch direction is preferred.

A backlight provides distribution of light from a light source over an area much larger than the light source, substantially over an entire emission or output surface area of the backlight. Light often enters the backlight along an edge surface and propagates between a back or reflective surface and the output surface from the edge surface toward an opposing end surface of the backlight by total internal reflection (TIR). In some embodiments, the backlight back surface includes structures, e.g., dots in a pattern. A light ray encountering one of these structures is redirected, i.e., either diffusely or specularly reflected, in such a manner that it is caused to exit the output surface. In other embodiments, backlight light is extracted by frustration of the TIR. A ray confined within the backlight by TIR increases its angle of incidence relative to the plane of the output surface and reflective surface, due to the wedge angle, with each TIR bounce. The light eventually refracts out of the output surface at a glancing angle thereto, because it is no longer contained by TIR.

FIG. 1 provides an illustrative but non-limiting perspective schematic view of a backlight 10. The backlight 10 includes a visible light transmissive body 15 having a light guide portion 20 and a light input portion 30. The visible light transmissive body 15 can be formed of any useful light transmissive material such as, for example, glass, quartz, and/or a polymeric material. Useful polymeric material includes polyesters, polycarbonates, polyimides, polyacrylates, polymethylstyrene, silicones such as GE's Invisisil liquid injection moldable material, and the like. In many embodiments, the light transmissive body is a solid body. The visible light transmissive body 15 can be formed via any useful method. In some embodiments, the visible light transmissive body 15 is formed via injection molding. In other embodiments, the visible light transmissive body 15 is formed via machining and optionally polishing of a solid slab of material.

In some embodiments, the light guide portion 20 and a light input portion 30 form a unitary or monolithic body. In other embodiments, the light guide portion 20 and a light input portion 30 are separate bodies having an interface surface 25, where the light guide portion 20 and a light input portion 30 are optically coupled together. The light input portion 30 and the light guide portion 20 whether separate or combined pieces can be fabricated by injection molding, casting, extrusion or by machining solid materials or any other suitable process. The optical coupling material is of an appropriate index to index match the light input portion 30 to the light guide portion 20.

The light guide portion 20 includes a light reflection surface 22 and a light output or emission surface 24. In the illustrated embodiment, the light reflection surface 22 and the emission surface 24 are substantially parallel. In other embodiments, the light reflection surface 22 and the emission surface 24 are substantially non-parallel. One or more optical elements can be disposed adjacent to the emission surface 24 as described below.

The light input portion 30 diverges from a narrow end 32. In many embodiments, the light input portion 30 is an asymmetric diverging wedge. The light input portion 30 includes opposing side surfaces 34, 36 that are not parallel and extend between the narrow end 32 (or light input surface) and the light guide portion 20. In some embodiments, the light input portion 30 includes opposing side surfaces 34, 36 that are not parallel and extend between the narrow end 32 and a wide end 31 adjacent to the interface surface 25. One of the opposing surfaces 34, 36 are co-planar with either the emission surface 24 or the reflection surface 22. In some embodiments, one of the opposing side surfaces 34 is co-planar with the emission surface 24. In other embodiments, one of the opposing side surfaces 36 is co-planar with the reflection surface 22. In many embodiments, the width ratio of the narrow end 32 to the wide end 31 (regardless of whether the interface surface 25 is presence or absent) is around 1:2, although it can be as low as 1:1.4 for index=1.5 material. In some backlight display embodiments, the narrow end has a width in a range from 1 to 20 mm. The length of the diverging wedge or light input portion 30 can assist in mixing light emitted from two or more light sources emitting light into the narrow end of the light input portion 30. In some embodiments, this length can be in a range from 5 to 200 mm.

A light source (shown in FIGS. 2-5) is disposed adjacent to the narrow end 32. The light source emits light into the light input portion 30. The light source can be any useful light source as described above. In many embodiments, the light source is a light emitting diode (LED). In many embodiments, a plurality of light sources can be arranged in an array along an opposing side 34, 36 and/or the narrow end 32, as desired.

In some embodiments, a linear array of LEDs (a plurality of red, blue, and green light emitting diodes) are disposed along the length of the narrow end 32.

A reflective layer (shown in FIGS. 2-5) is disposed on or adjacent to the opposing side surfaces 34, 36. The reflective layer can be any useful reflective material such as, for example, a metal or dielectric material. In many embodiments, the reflective layer is a multilayer polymeric mirror film disposed adjacent to the opposing side surfaces 34, 36. The multilayer polymeric mirror film is described above and reflects more than 95% of visible light incident on the multilayer polymeric mirror film. Multilayer polymeric mirror film or any other useful reflective layer can be disposed along the narrow end 30 to assist in reflecting light emitted by the light source toward the light guide portion 20. In many embodiments, the multilayer polymeric mirror film is Vikuiti™ ESR film, which is available from 3M Company, St. Paul, Minn.

Figure 2:
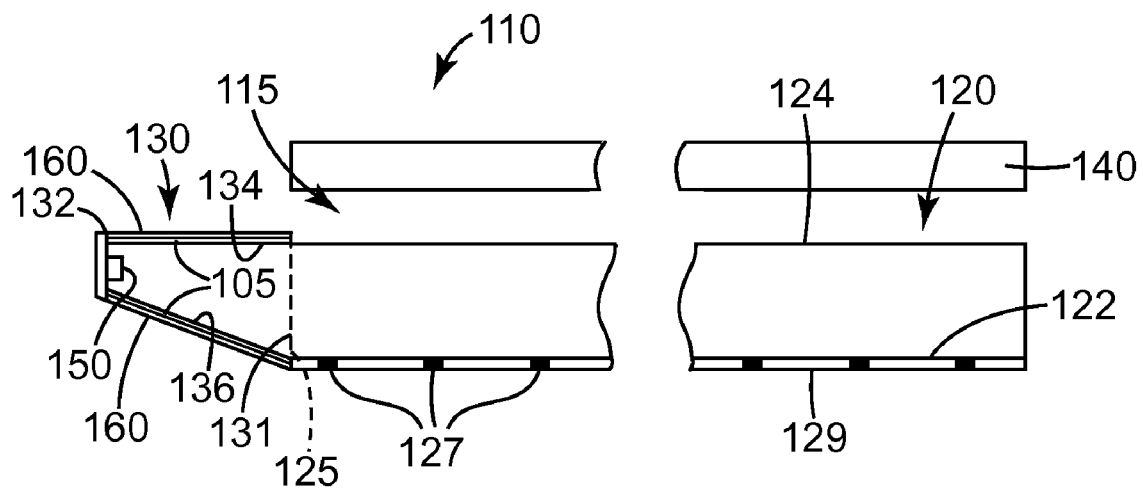
FIG. 2 is a cross-sectional view of the backlight shown in FIG. 1 taken along lines 2-2.

FIG. 2 is a cross-sectional view of the backlight 10 shown in FIG. 1 taken along lines 2-2. The backlight 110 includes a visible light transmissive body 115 having a light guide portion 120 and a light input portion 130. The visible light transmissive body 115 can be formed of any useful light transmissive material as described above. In some embodiments, the light guide portion 120 and a light input portion 130 form a unitary or monolithic body. In other embodiments, the light guide portion 120 and a light input portion 130 are separate bodies having an interface surface 125, where the light guide portion 120 and a light input portion 130 are optically coupled together.

The light guide portion 120 includes a light reflection surface 122 and a light output or emission surface 124. In the illustrated embodiment, the light reflection surface 122 and the emission surface 124 are substantially parallel. In many embodiments, the light reflection surface 122 includes a specular and/or diffuse reflective layer 129 and a plurality of light extraction elements 127, as described above. The light extraction elements 127 can be arranged in any useful random or non-random or pseudo-random pattern, as desired, to provide uniform extraction of light from the backlight. In some embodiments, the plurality of light extraction elements 127 form a pattern of dots from 0.1 to 10 mm in diameter.

One or more optical elements 140 can be disposed adjacent to the emission surface 124. In some embodiments, the optical element 140 includes a liquid crystal display. In other embodiments, the optical element 140 includes a liquid crystal display and one or more optical films disposed between the liquid crystal display and the emission surface 124. In a further embodiment, the optical element 140 is a graphic film or other optical film. In a further embodiment, the optical element 140 many not be needed, for example, it the emission surface 124 is used as a light source or luminaire.

The light input portion 130 diverges from a narrow end 132. In many embodiments, the light input portion 130 is an asymmetric diverging wedge. The light input portion 130 includes opposing side surfaces 134, 136 that are not parallel and extend between the narrow end 132 and the light guide portion 120. In some embodiments, the light input portion 130 includes opposing side surfaces 134, 136 that are not parallel and extend between the narrow end 132 and a wide end 131 adjacent to the interface surface 125. In many embodiments, one of the opposing side surfaces 134 is co-planar with the emission surface 124. In many embodiments, the width ratio of the narrow end 132 to the wide end 131 (regardless of whether the interface surface 125 is presence or absent) is around 1:2, although it can be as low as 1:1.4 for index=1.5 material. Illustrative dimensions of the light input portion 130 are described above.

A light source 150 is disposed adjacent to the narrow end 132. The light source 150 emits light into the light input portion 130. The light source 150 can be any useful light source as described above. In many embodiments, the light source 150 is a light emitting diode (LED). In some embodiments, a linear array of LEDs 150 (a plurality of red, blue, and green light emitting diodes) are disposed along a length of the narrow end 130.

A reflective layer 160 is disposed on or adjacent to the opposing side surfaces 134, 136. The reflective layer 160 can be any useful reflective material such as, for example, a metal or dielectric material. In many embodiments, the reflective layer 160 is a multilayer polymeric mirror film disposed adjacent to the opposing side surfaces 134, 136. The multilayer polymeric mirror film 160 is described above and reflects more than 95% of visible light incident (at all angles) on the multilayer polymeric mirror film 160. In some embodiments, the multilayer polymeric mirror film 160 reflects more than 98% of visible light incident at all angles on the multilayer polymeric mirror film 160. Multilayer polymeric mirror film 160 or any other useful reflective layer can be disposed along the narrow end 132 to assist in reflecting light emitted by the light 150 source toward the light guide portion 120, however this is not required. In many embodiments, the multilayer polymeric mirror film is Vikuiti™ ESR film, which is available from 3M Company, St. Paul, Minn.

In many embodiments, the multilayer polymeric mirror film 160 is disposed adjacent to the opposing side surfaces 134, 136 but is not in intimate contact with the opposing side surfaces 134, 136. In many embodiments, an air gap 105 is defined between the multilayer polymeric mirror film 160 and the opposing side surfaces 134, 136.

Figure 3:
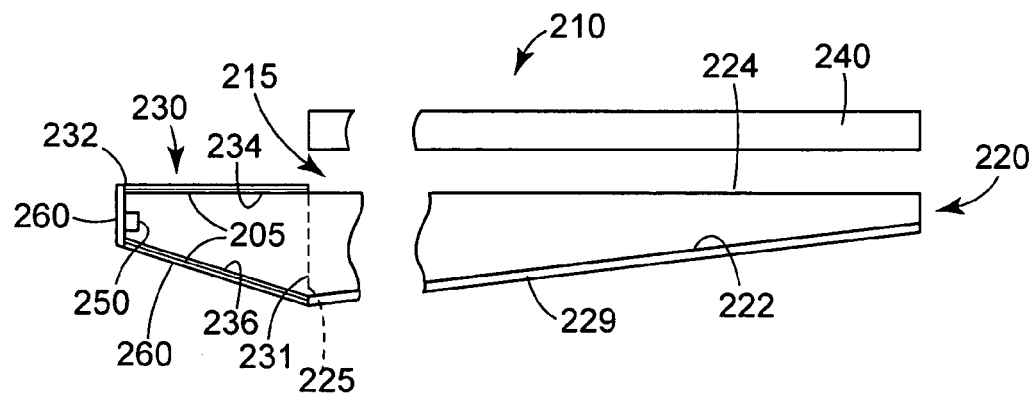
FIGS. 3 to 5 are cross-sectional views of alternative backlight configurations.

FIG. 3 is a cross-sectional view of an alternative backlight 210 configuration. The backlight 210 includes a visible light transmissive body 215 having a light guide portion 220 and a light input portion 230. The visible light transmissive body 215 can be formed of any useful light transmissive material as described above. In some embodiments, the light guide portion 220 and a light input portion 230 form a unitary or monolithic body. In other embodiments, the light guide portion 220 and a light input portion 230 are separate bodies having an interface surface 225, where the light guide portion 220 and a light input portion 230 are optically coupled together.

The light guide portion 220 includes a light reflection surface 222 and a light output or emission surface 224. In the illustrated embodiment, the light reflection surface 222 and the emission surface 224 are substantially non-parallel and form a converging wedge shape. In many embodiments, the light reflection surface 222 includes a specular and/or diffuse reflective layer 229, as described above.

One or more optical elements 240 can be disposed adjacent to the emission surface 224. In some embodiments, the optical element 240 includes a liquid crystal display. In other embodiments, the optical element 240 includes a liquid crystal display and one or more optical films disposed between the liquid crystal display and the emission surface 224. In a further embodiment, the optical element 240 is a graphic film or other optical film. In a further embodiment, the optical element 240 many not be needed, for example, it the emission surface 224 is used as a light source or luminaire.

The light input portion 230 diverges from a narrow end 232. In many embodiments, the light input portion 230 is an asymmetric diverging wedge. The light input portion 230 includes opposing side surfaces 234, 236 that are not parallel and extend between the narrow end 232 and the light guide portion 220. In some embodiments, the light input portion 230 includes opposing side surfaces 234, 236 that are not parallel and extend between the narrow end 232 and a wide end 231 adjacent to the interface surface 225. One of the opposing surfaces 234, 236 is co-planar with either the emission surface 224 or the reflection surface 222. In some embodiments, one of the opposing side surfaces 234 is co-planar with the emission surface 224. In other embodiments, one of the opposing side surfaces 236 is co-planar with the reflection surface 222. In many embodiments, the width ratio of the narrow end 232 to the wide end 231 (regardless of whether the interface surface 225 is presence or absent) is around 1:2, although it can be as low as 1:1.4 for index=1.5 material. Illustrative dimensions of the light input portion 230 are described above.

A light source 250 is disposed adjacent to the narrow end 232. The light source 250 emits light into the light input portion 230. The light source 250 can be any useful light source as described above. In many embodiments, the light source 250 is a light emitting diode (LED). In some embodiments, a linear array of LEDs 250 (a plurality of red, blue, and green light emitting diodes) are disposed along a length of the narrow end 232.

A reflective layer 260 is disposed on or adjacent to the opposing side surfaces 234, 236. The reflective layer 260 can be any useful reflective material such as, for example, a metal or dielectric material. In many embodiments, a multilayer polymeric mirror film 260 is disposed adjacent to the opposing side surfaces 234, 236. The multilayer polymeric mirror film 260 is described above and reflects more than 95% of visible light incident on (at all angles) the multilayer polymeric mirror film 260. In some embodiments, the multilayer polymeric mirror film 260 reflects more than 98% of visible light incident at all angles on the multilayer polymeric mirror film 260. Multilayer polymeric mirror film 260 or any other useful reflective layer can be disposed along the narrow end 230 to assist in reflecting light emitted by the light 250 source toward the light guide portion 220, but this is not required. In many embodiments, the multilayer polymeric mirror film is Vikuiti™ ESR film, which is available from 3M Company, St. Paul, Minn.

In many embodiments, the multilayer polymeric mirror film 260 is disposed adjacent to the opposing side surfaces 234, 236 but is not in intimate contact with the opposing side surfaces 234, 236. In many embodiments, an air gap 205 is defined between the multilayer polymeric mirror film 260 and the opposing side surfaces 234, 236.

Figure 4:
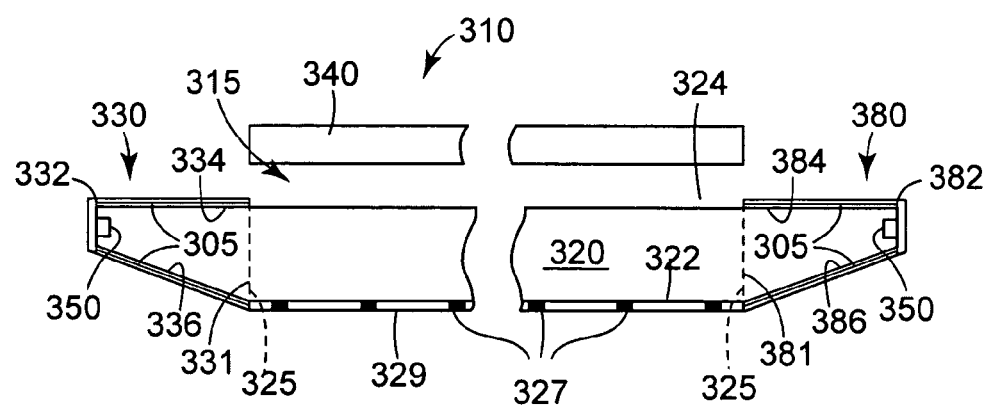

FIG. 4 is a cross-sectional view of an alternative backlight 310 configuration. The backlight 310 includes a visible light transmissive body 315 having a light guide portion 320, a first light input portion 330 and a second light input portion 380. The first light input portion 330 and the second light input portion 380 may be the same or different. For illustration purposes, the first and second light input portions 330, 380 are described similarly, but this is not required.

The visible light transmissive body 315 can be formed of any useful light transmissive material, as described above. In some embodiments, the light guide portion 320 and the first light input portion 330 and the second light input portion 380 form a unitary or monolithic body. In other embodiments, the light guide portion 320 and the first light input portion 330 and the second light input portion 380 are separate bodies having interface surfaces 325, where the light guide portion 320 and the first light input portion 330 and second light input portions 380 are optically coupled together.

The light guide portion 320 includes a light reflection surface 322 and a light output or emission surface 324. In the illustrated embodiment, the light reflection surface 322 and the emission surface 324 are substantially parallel. In many embodiments, the light reflection surface 322 includes a specular and/or diffuse reflective layer 329 and a plurality of light extraction elements 327, as described above. The light extraction elements 327 can be arranged in any useful random or non-random or pseudo-random pattern, as desired, to provide uniform extraction of light from the backlight. In some embodiments, the plurality of light extraction elements 327 form a pattern of dots from 0.1 to 10 mm in diameter.

One or more optical elements 340 can be disposed adjacent to the emission surface 324. In some embodiments, the optical element 340 includes a liquid crystal display. In other embodiments, the optical element 340 includes a liquid crystal display and one or more optical films disposed between the liquid crystal display and the emission surface 324. In a further embodiment, the optical element 340 is a graphic film or other optical film. In a further embodiment, the optical element 340 many not be needed, for example, it the emission surface 324 is used as a light source or luminaire.

The first light input portion 330 diverges from a narrow end 332 and the second light input portion 380 diverges from a narrow end 382. In many embodiments, the first and second light input portions 330, 380 are asymmetric diverging wedges. The first light input portion 330 includes opposing side surfaces 334, 336 that are not parallel and extend between the narrow end 332 and the light guide portion 320. The second light input portion 380 includes opposing side surfaces 384, 386 that are not parallel and extend between the narrow end 382 and the light guide portion 320. In some embodiments, the first and second light input portions 330, 380 between the narrow end 332, 382 and a wide end 331, 381 adjacent to the interface surfaces 325. One of the opposing surfaces 334, 336 or 384, 386 are co-planar with either the emission surface 324 or the reflection surface 322. In some embodiments, one of the opposing side surfaces 334, 384 is co-planar with the emission surface 324. In other embodiments, one or both of the opposing side surfaces 336, 386 is/are co-planar with the reflection surface 322. In many embodiments, one of the opposing side surfaces 334, 384 is co-planar with the emission surface 324. In many embodiments, both of the opposing side surfaces 334 and 384 are co-planar with the emission surface 324. In many embodiments, the width ratio of the narrow end 332, 382 to the wide end 331, 381 (regardless of whether the interface surface 325 is presence or absent) is around 1:2, although it can be as low as 1:1.4 for index=1.5 material. Illustrative dimensions of the light input portion 330, 380 are described above.

A light source 350 is disposed adjacent to the narrow ends 332, 382. The light source 350 emits light into the light input portions 330, 380. The light source 350 can be any useful light source as described above. In many embodiments, the light source 350 is a light emitting diode (LED). In some embodiment, a linear array of LEDs 350 (a plurality of red, blue, and green light emitting diodes) are disposed along the length of the narrow end 332, 382.

A reflective layer 360 is disposed on or adjacent to the opposing side surfaces 334, 336. The reflective layer 360 can be any useful reflective material such as, for example, a metal or dielectric material. In many embodiments, a multilayer polymeric mirror film 360 is disposed adjacent to the opposing side surfaces 334, 336, 384, 386. The multilayer polymeric mirror film 360 is described above and reflects more than 95% of visible light incident on the multilayer polymeric mirror film 360. In some embodiments, the multilayer polymeric mirror film 360 reflects more than 98% of visible light incident at all angles on the multilayer polymeric mirror film 360. Multilayer polymeric mirror film 360 or any other useful reflective layer can be disposed along the narrow end 330, 380 to assist in reflecting light emitted by the light 350 source toward the light guide portion 320, however this is not required. In many embodiments, the multilayer polymeric mirror film is Vikuiti™ ESR film, which is available from 3M Company, St. Paul, Minn.

In many embodiments, the multilayer polymeric mirror film 360 is disposed adjacent to the opposing side surfaces 334, 336, 384, 386 but is not in intimate contact with the opposing side surfaces 334, 336, 384, 386. In many embodiments, an air gap 305 is defined between the multilayer polymeric mirror film 360 and the opposing side surfaces 334, 336, 384, 386.

Figure 5:
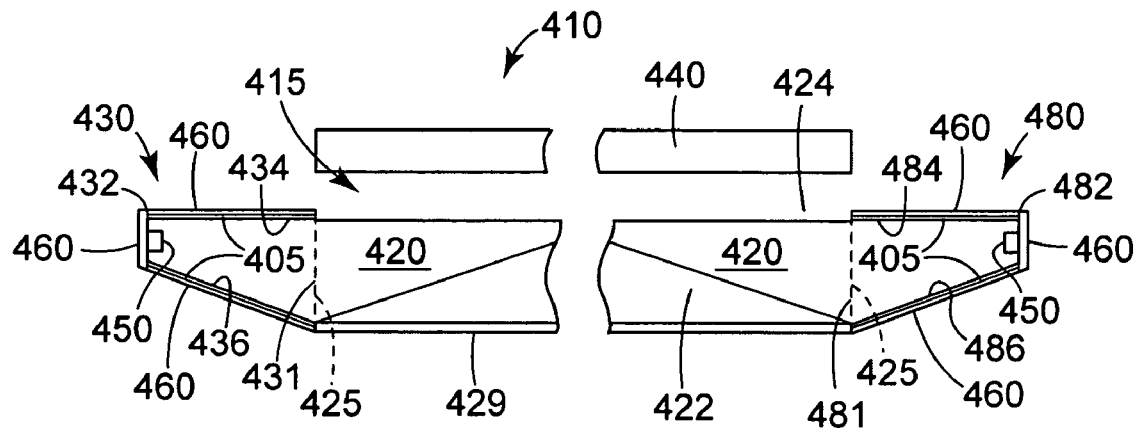

FIG. 5 is a cross-sectional view of an alternative backlight 410 configuration. The backlight 410 includes a visible light transmissive body 415 having a light guide portion 420 and a first light input portion 430 and a second light input portion 480. The first light input portion 430 and the second light input portion 480 may be the same or different. For illustration purposes, the first and second light input portions 430, 480 are described similarly, but this is not required.

The visible light transmissive body 415 can be formed of any useful light transmissive material as described above. In some embodiments, the first light guide portion 420, first light input portion 430, and second light input portion 480 form a unitary or monolithic body. In other embodiments, the first light guide portion 420, first light input portion 430, and second light input portion 480 are separate bodies having an interface surfaces 425, where the light guide portion 420, the first light input portion 430, and the second light input portion 480 are optically coupled together.

The light guide portion 420 includes a light reflection surface 422 and a light output or emission surface 424. In the illustrated embodiment, the light reflection surface 422 and the emission surface 424 are substantially non-parallel and form a converging wedge shape. In many embodiments, the light reflection surface 422 includes a specular and/or diffuse reflective layer 429, as described above.

One or more optical elements 440 can be disposed adjacent to the emission surface 424. In some embodiments, the optical element 440 includes a liquid crystal display. In other embodiments, the optical element 440 includes a liquid crystal display and one or more optical films disposed between the liquid crystal display and the emission surface 424. In a further embodiment, the optical element 440 is a graphic film or other optical film. In a further embodiment, the optical element 440 many not be needed, for example, it the emission surface 424 is used as a light source or luminaire.

The first light input portion 430 diverges from the narrow end 432 and the second light input portion 480 diverges from the narrow end 482. In many embodiments, the first light input portion 430 is a diverging wedge and the second light input portion 480 is a diverging wedge. The first light input portion 430 includes opposing side surfaces 434, 436 that are not parallel and extend between the narrow end 432 and the light guide portion 420 and the second light input portion 480 includes opposing side surfaces 484, 486 that are not parallel and extend between the narrow end 482 and the light guide portion 420. In some embodiments, the light input portions 430, 480 include opposing side surfaces 434, 436, 484, 486 that are not parallel and extend between the narrow ends 432, 482 and a wide end 431, 481 adjacent to the interface surfaces 425. One of the opposing surfaces 434, 436 or 484, 486 are co-planar with either the emission surface 424 or the reflection surface 422. In some embodiments, one of the opposing side surfaces 434, 484 is co-planar with the emission surface 424. In other embodiments, one or both of the opposing side surfaces 436, 486 is/are co-planar with the reflection surface 422. In many embodiments, one of the opposing side surfaces 434, 484 is co-planar with the emission surface 424. In many embodiments, both of the opposing side surfaces 434 and 484 are co-planar with the emission surface 424. In many embodiments, the width ratio of the narrow end 432, 482 to the wide end 431, 481 (regardless of whether the interface surface 425 is presence or absent) is around 1:2, although it can be as low as 1:1.4 for index=1.5 material. Illustrative dimensions of the light input portion 430, 480 are described above.

Light sources 450 are disposed adjacent to the narrow ends 432, 482. The light sources 450 emit light into the light input portions 430, 480. The light source 450 can be any useful light source as described above. In many embodiments, the light source 450 is a light emitting diode (LED). In some embodiment, a linear array of LEDs 450 (a plurality of red, blue, and green light emitting diodes) are disposed along a length of the narrow end 432, 482.

A reflective layer 460 is disposed on or adjacent to the opposing side surfaces 434, 436. The reflective layer 460 can be any useful reflective material such as, for example, a metal or dielectric material. In many embodiments, a multilayer polymeric mirror film 460 is disposed adjacent to the opposing side surfaces 434, 436, 484, 486. The multilayer polymeric mirror film 460 is described above and reflects more than 95% of visible light incident on the multilayer polymeric mirror film 460. In some embodiments, the multilayer polymeric mirror film 460 reflects more than 98% of visible light incident at all angles on the multilayer polymeric mirror film 460. Multilayer polymeric mirror film 460 or any other useful reflective layer can be disposed along the narrow end 432, 482 to assist in reflecting light emitted by the light 450 source toward the light guide portion 420, but this is not required. In many embodiments, the multilayer polymeric mirror film is Vikuiti™ ESR film, which is available from 3M Company, St. Paul, Minn.

In many embodiments, the multilayer polymeric mirror film 460 is disposed adjacent to the opposing side surfaces 434, 436, 484, 486 but is not in intimate contact with the opposing side surfaces 434, 436, 484, 486. In many embodiments, an air gap 405 is defined between the multilayer polymeric mirror film 460 and the opposing side surfaces 434, 436, 484, 486.

Figure 6:
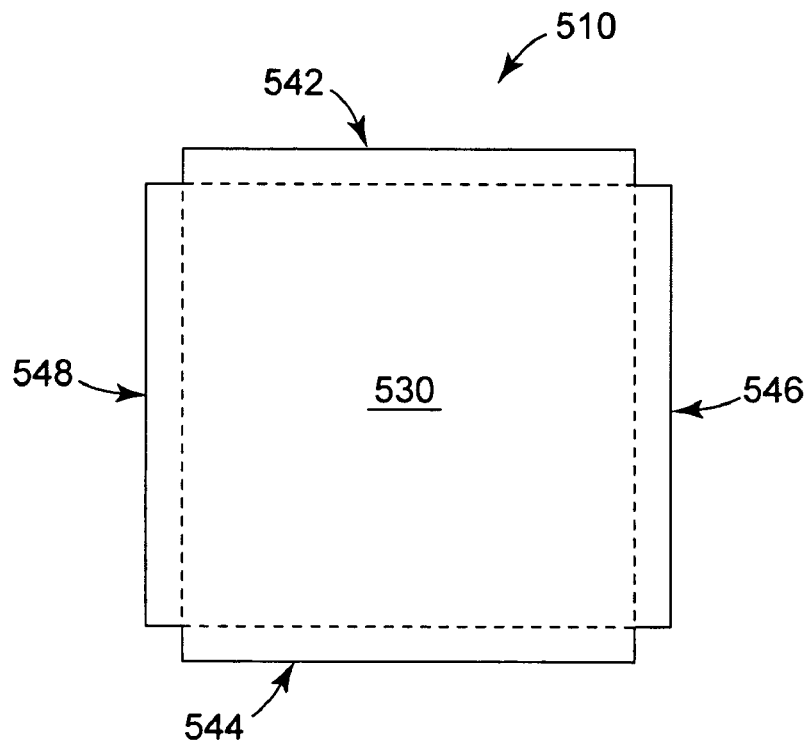
FIG. 6 is a top plan view of another backlight configuration.

In the illustrations discussed thus far, the backlights described herein included either one or two light input portions. In some cases, it is contemplated that three, four or more light input portions could be employed utilizing some or all of the elements described above. FIG. 6 is a schematic top view of a backlight 510 that includes a light guide portion 530 (showing the emission surface of the backlight 510). The backlight 510 also includes a first light input portion 542, a second light input portion 544, a third light input portion 546 and a fourth light input portion 548. Each light input portion 542, 544, 546 and 548 may be integrally molded or otherwise formed with the light guide portion 530. In other instances, one or more of the light input portions 542, 544, 546 and 548 may be formed separately and then subsequently attached (optically coupled) to the light guide portion 530.

Each of the light input portions 542, 544, 546 and 548 may include one or more light sources, including light sources 150, 250, 350 and 450 as previously discussed. Each light input portion 542, 544, 546 and 548 may include a light source or a plurality of light sources.

The illustrated backlight 510 is shown generally having a square shape, however the backlight can have any polygonal shape and including one or more light input portions (including the light sources) adjacent to one or more of the polygonal sides. In some embodiments, the backlight 510 has a rectangular shape with either a 4 to 3 aspect ratio or a 16 to 9 aspect ratio, and can be useful in television or monitor application. In some embodiments, the backlight 510 is used in conjunction with a commercial graphics display, or a sign.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

We claim:

1. A backlight comprising:
    an asymmetric diverging wedge defined by a narrow end surface and a wide end surface, and opposing side surfaces that are not parallel and extend between the narrow end and the wide end;
    a solid state light source extending into the asymmetric diverging wedge at the narrow end surface, the solid state light source emitting light into the narrow end surface of the diverging wedge;
    a light guide optically coupled to the wide end surface, the light guide having a light reflection surface and a light emission surface, and one of the opposing side surfaces being co-planar from the narrow end surface to the wide end surface with either the light emission surface or the light reflection surface; and
    a reflective layer disposed parallel with and adjacent to or on each of the opposing side surfaces.

2. A backlight according to claim 1 wherein the reflective layer is a multilayer polymeric mirror film disposed adjacent to the opposing side surfaces, the multilayer polymeric mirror film reflecting more than 95% of visible light incident on the multilayer polymeric mirror film.

3. A backlight according to claim 1 wherein the light emission surface and the light reflection surface are parallel, and the light reflection surface comprises a plurality of light extraction elements.

4. A backlight according to claim 1 wherein the light emission surface and the light reflection surface are non-parallel.

5. A backlight according to claim 2 wherein one opposing side surface of the asymmetric diverging wedge is co-planar with the emission surface.

6. A backlight according to claim 3 further comprising an air gap disposed between the specularly reflective layer and each first and second opposing side surfaces.

7. A backlight comprising:
    a first asymmetric diverging wedge defined by a first narrow end surface and a first wide end surface, and first opposing side surfaces that are not parallel and extend between the first narrow end and the first wide end;
    a first solid state light source extending into the first asymmetric diverging wedge at the first narrow end surface, the first solid state light source emitting light into the first narrow end surface of the first asymmetric diverging wedge;
    a second asymmetric diverging wedge defined by a second narrow end surface and a second wide end surface, and second opposing side surfaces that are not parallel and extend between the second narrow end and the second wide end;
    a second solid state light source extending into the second asymmetric diverging wedge at the second narrow end surface, the second solid state light source emitting light into the second narrow end surface of the second asymmetric diverging wedge;

a light guide optically coupled to the first wide end surface and the second wide end surface, the light guide having a light reflection surface and a light emission surface, and one of the first and second opposing side surfaces being co-planar from the narrow end surface to the wide end surface with either the light emission surface or the light reflection surface; and a reflective layer disposed parallel with and adjacent to or on each of the opposing side surfaces.

8. A backlight according to claim 7 wherein the reflective layer is a multilayer polymeric mirror film disposed adjacent to the opposing side surfaces, the multilayer polymeric mirror film reflecting more than 95% of visible light incident on the multilayer polymeric mirror film.

9. A backlight according to claim 7 wherein the first solid state light source comprises a plurality of solid state light sources emitting red, blue and green light and the second solid state light source comprises a plurality of solid state light sources emitting red, blue and green light.

10. A backlight according to claim 8 further comprising an air gap disposed between the multilayer polymeric mirror film and each first and second opposing side surfaces.

11. A backlight according to claim 7 wherein the light emission surface and the light reflection surface are parallel, and the light reflection surface comprises a plurality of light extraction elements.

12. A backlight according to claim 7 wherein the light emission surface and the light reflection surface are non-parallel.

13. A backlight according to claim 7 further comprising a third diverging wedge defined by a third narrow end surface and a third wide end surface, and third opposing side surfaces that are not parallel and extend between the third narrow end and the third wide end; a third light source disposed adjacent to the third narrow end surface, the third light source emitting light into the third narrow end surface of the third diverging wedge; the light guide optically coupled to the third wide end surface; and multilayer polymeric mirror film disposed adjacent to the third opposing side surfaces, the multilayer polymeric mirror film reflecting more than 95% of light incident on the multilayer polymeric mirror film.

14. A backlight according to claim 7 further comprising a liquid crystal display panel disposed adjacent to the light emission surface.

* * * * *